Jan. 18, 1949.                    C. C. BROWN                         2,459,614
                                  KNUCKLE JOINT
                              Filed Oct. 13, 1947

C. C. BROWN
INVENTOR.

BY

ATTORNEY

Patented Jan. 18, 1949

2,459,614

UNITED STATES PATENT OFFICE 2,459,614

KNUCKLE JOINT

Cicero C. Brown, Houston, Tex.

Application October 13, 1947, Serial No. 779,576

6 Claims. (Cl. 285—93)

This invention relates to knuckle joints and particularly to knuckle joints of the type used in fishing strings employed in connection with rotary well drilling.

Knuckle joints are employed to provide a pivoted section in a fishing string to which suitable fishing tools may be attached and which, because of its pivoted construction, permits the fishing tools to be rotated at an angle to the axis of the bore hole in order to catch or pick up broken tools or the broken end of a pipe string which have fallen to one side of the bore hole and particularly in cavities along the bore hole.

A principal object of the present invention is to provide a form of knuckle joint of relatively simple construction, which is efficient in operation.

An important object is the provision of an improved form of knuckle joint employing fluid pressure to actuate the pivot arm of the joint for angular movement with respect to the fishing string.

A more specific object is the provision of a knuckle joint having a wash pipe extending therethrough which is provided with a flexible section between the pivot arm and the stationary member of the joint.

Other and more specific objects and advantages of this invention will become apparent from the following detailed description when read in conjunction with the accompanying drawings which illustrate one useful embodiment of a knuckle joint in accordance with this invention.

Figure 4:
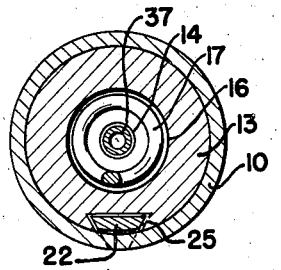
Fig. 4 is a cross-sectional detail of the tool taken along line 4—4 of Fig. 1.
Figure 3:
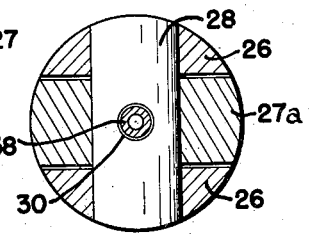
Fig. 3 is a cross-sectional detail of the tool taken along line 3—3 of Fig. 1.

Referring to the drawings, the knuckle joint in accordance with this invention comprises a hollow cylindrical casing 10 internally threaded at its lower end at 11 and provided in its upper end with a hollow tool joint box 12 of conventional internally threaded construction. A closure member 13 threaded externally at its upper end is screwed into the open lower end of casing 10 and is provided with an axial passageway 14 of restricted cross-sectional area, which is outwardly flared on one side thereof at its lower end as indicated at 15. Passageway 14 is enlarged in diameter at its upper end to form a spring-receiving recess 16, in which is seated a coil spring 17. Mounted in the upper portion of the interior of casing 10 above closure 13 is a piston 18, having a plurality of sealing rings 19 suitably mounted in its periphery to form a fluid-tight sliding connection with the wall of casing 10. Piston 18 is provided with axial passageway 20, which registers with passageway 14 and having at its upper end a choke 21 of conventional form. An arm 22 is removably mounted at one side of piston 18 by means of a dovetail tongue 23, which is slidably receivable in a complementary groove 24 in the side of the piston. Arm 22 extends longitudinally from piston 18 inside of the wall of casing 10 through a suitable slot 25 in the outer wall of closure 13 (Fig. 4). Arm 22 thus being slidable longitudinally of slot 25 in response to the movements of piston 18. Coil spring 17, mounted in recess 16, is held in compression between the lower end of piston 18 and closure 13. The lower end of closure 13 is provided with a pair of laterally spaced arms 26 (see Fig. 3, particularly) forming a clevis or yoke into which a tongue 27a, formed on the upper end of a pivot arm 27, extends and is pivotally connected thereto by means of a pivot pin 28 which extends transversely through suitable registering openings in arms 26 and tongue 27a, whereby pivot arm 27 may turn at an angle relative to the longitudinal axis of the tool. Pivot arm 27 is provided with an axial passageway 29 registering with passageway 14 and pivot pin 28 is likewise provided with a passageway 30 registering with passageways 29 and 14. The upper end of passageway 29 is flared outwardly at 31 at one side thereof opposite flared portion 15 of passageway 14. The upper end of tongue 27a is provided at one side thereof with an inwardly and downwardly sloping cam surface 32 which cooperates with the outer end of arm 32 which is rounded for relatively smooth sliding engagement with cam surface 32. The upper end surface of tongue 27a is machined off on the side opposite cam surface 32 to form a downwardly sloping surface 34, so that tongue 27a will not bind on the lower end of closure 13 when pivot arm 27 is rotated about pivot pin 28. The lower end of pivot arm 27 is provided with the conventional externally threaded tool joint pin 40 for connection to a suitable fishing tool, passageway 29 extending through pin 40.

Figure 2:
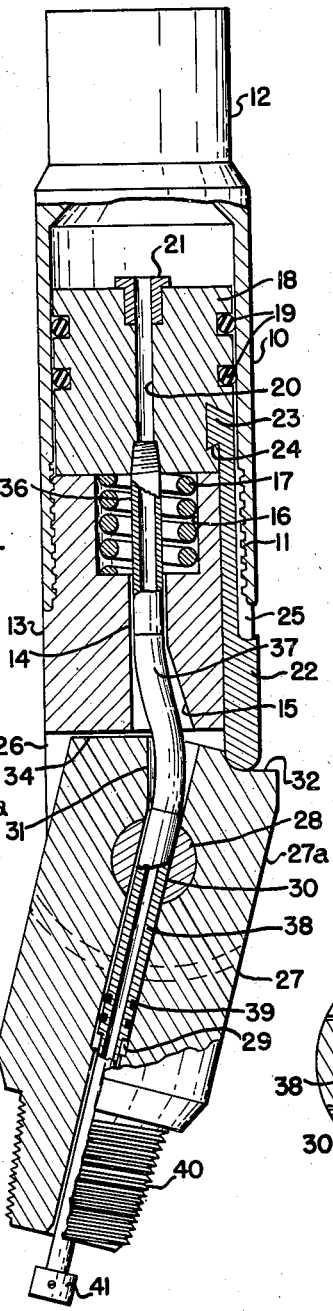
Fig. 2 is a view similar to Fig. 1 in which the pivot arm is shown in its knuckled or angular position.
Figure 5:
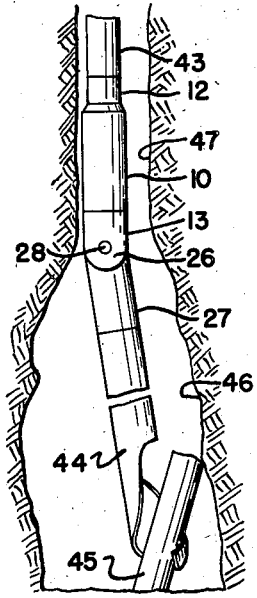
Fig. 5 is a view illustrating the position of the tool in a well as employed in conducting a fishing operation.

A wash pipe, comprising an upper section 36, an intermediate section 37 and a lower section 38, extends through registering passageways 14, 29 and 30 and is of slightly smaller external diameter than the diameter of the passageways. Upper section 36, which extends only partly through closure 13, has its upper end screwed tightly into the lower end of passageway 20 to thereby provide communication between the wash pipe and the interior of casing 10 above piston 18. By virtue of this connection and the difference in diameters of the wash pipe and the passageways, the wash pipe will be slidable longitudinally of the registering passageways in response to the movements of piston 18. Lower section 38 of the wash pipe is mounted in passageway 29 and extends through passageway 30 of pivot pin 28 and through the lower end of the pivot arm. Upper and lower sections 36 and 38 of the wash pipe are connected together by section 37 which is constructed of flexible material such as rubber, rubberized fabric or flexible metal such as copper tubing, whereby when pivot arm 27 is knuckled, the flexible joint thus provided in the wash pipe will permit such movement without breaking or otherwise damaging the wash pipe. Tapering sections 15 and 31 of the passageways in the knuckle members provide an area in which the bending movement of flexible section 37 may take place without danger of pinching or breaking the pipe, as is illustrated, particularly in Fig. 2. Suitable packing, such as O-rings 39, is mounted between the exterior of section 38 of the wash pipe and passageway 29, to form a fluid-tight seal therebetween. The outer end of section 38 of the wash pipe is provided with a stop ring or nut 41 which is locked thereto by means of a set screw 42 and serves to limit any tendency of the wash pipe to be drawn or forced to any undue extent into the interior of the tool.

Figure 1:
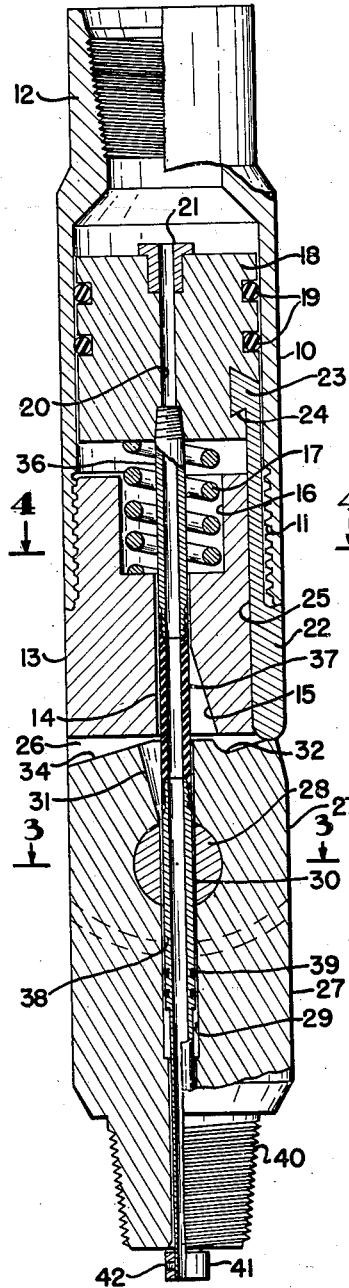
Fig. 1 is a longitudinal sectional view of an embodiment in accordance with this invention showing the pivot arm in its retracted position.

The above-described knuckle joint is employed in the following manner. Box 12 is connected to the lower end of a pipe string 43 (Fig. 4) such as a drill pipe string or a fishing string, and pin 40 is connected to a suitable fishing tool such as a wall-hook 44 which is conventionally employed for grasping the upper end of a broken pipe 45 which has fallen to one side of a cavity 46 in a well bore 47 in the manner illustrated. When the string of tools, including the knuckle joint, is inserted initially in the well bore the knuckle joint will be in the straight or retracted position illustrated in Fig. 1. When the tools have been lowered to the desired point in the well, fluid such as water or drilling mud will be pumped in the conventional manner down the interior of the string, and through the knuckle joint. Due to the construction provided by choke 21 and the constricted area of passageway 20, fluid pressure will develop inside casing 10 and will act on the face of piston 18 to force it downwardly. The outer end of arm 22 will thereupon co-act with cam surface 32 to cause pivot arm 27 to knuckle or turn at an angle about pivot pin 28 and assume the position shown in Figs. 2 and 4. The wash pipe will likewise move correspondingly longitudinally of registering passageways 14, 29 and 30, and flexible section 37 will bend in response to the turning of pivot arm, without in any way interrupting or hindering the flow of fluid through the wash pipe and without interfering with the knuckling movement of pivot arm 27. The fishing string may now be rotated, while fluid circulation is maintained through the wash pipe, to cause the fishing tool connected to arm 37 to sweep in a circular path about the wall of the well bore or through any cavity which may be present, thereby enabling the fishing tool to grasp or hook on to any object which may be lying to one side of the axis of the well bore. When the object sought has been grasped, rotation of the fishing string and pumping of the fluid is stopped to relieve the pressure on the knuckle joint. Coil spring 17 will expand, causing the piston and its attached arm 22 to retract, and pivot arm 27 will return to its original axially aligned position, either of its own weight or by virtue of the weight of the connected fishing tools and objects grasped thereby.

One of the particular advantages of the knuckle joint in accordance with this invention arises from the novel arrangement whereby section 38 of the wash pipe is extended through pivot pin 28. With this arrangement, section 38 forms a very simple and efficient lock for the pivot pin which assures its retention in place in the joint, despite the hammering and battering to which such joints are normally subjected, thus obviating one of the principal difficulties with existing designs of knuckle joints.

The continuous unbroken wash pipe arrangement of the herein-described structure, with the provision of sealing rings 19 about the piston and sealing rings 39 between wash pipe section 38 and passageway 29, serves to keep the wash liquid out of contact with the moving parts of the knuckle joint, and thereby overcomes the erosive effect of conventional drilling fluids in existing forms of joints in which, because of their construction, the fluid is normally allowed to flow at its usual high velocity over and about the moving surfaces of the joints, thereby greatly shortening their useful life and efficiency.

It will be understood that the length of pivot arm 27 may be varied as required and other changes and modifications may be made in the details of the embodiment herein described without departing from the scope of the appended claims, but within the spirit of this invention.

What I claim and desire to secure by Letters Patent is:

1. A knuckle joint, comprising, a pair of axially aligned knuckle members, a pivot pin extending through adjacent portions of said members transversely of the axis thereof to permit angular movement therebetween, a piston reciprocably disposed in one of said knuckle members carrying a thrust member engageable with the other of said knuckle members for rocking the latter about said pivot pin, a fluid conduit having one end rigidly connected to said piston and extending through said knuckle members and said pivot pin and movable axially of said knuckle members in response to the movements of said piston, said conduit including a flexible section extending across the adjacent ends of said knuckle members, a passageway of restricted cross-sectional area through said piston, communicating with said conduit, and means for admitting pressure fluid into the knuckle member containing said piston.

2. A knuckle joint, comprising, a pair of axially aligned knuckle members, a pivot pin extending through adjacent portions of said members transversely of the axis thereof to permit angular movement therebetween, registering passageways extending axially through said members and through said pivot pin, a piston having an axial bore of restricted cross-sectional area therethrough reciprocably disposed in one of said knuckle members and carrying a thrust member engageable with the other of said knuckle members for rocking the latter about said pivot pin, a fluid conduit extending through said registering passageways having one end rigidly connected to said piston in communication with said axial bore and slidable in said passageways in response to the movements of said piston, said conduit including a flexible section extending across the adjacent ends of said knuckle members, sealing means between said piston and the wall of its containing knuckle member and between said conduit and said passageway in the other of said members, and means for admitting actuating fluid into the knuckle member containing said piston.

3. A knuckle joint, comprising, a hollow stationary member, a movable member axially aligned therewith, a closure for the end of said stationary member adjacent said movable member, a pivot pin extending through adjacent portions of said closure and said movable member transversely of the axis thereof to permit angular movement therebetween, a piston having an axial bore of restricted cross-sectional area therethrough reciprocably disposed in said stationary member, spring means mounted between said closure and said piston to normally urge the latter away from said closure, a thrust arm carried by said piston and slidably extending through said closure into engagement with a cooperating cam surface disposed on the adjacent end of said movable member for rocking the latter about said pivot pin, registering passageways extending axially through said closure member, said movable member and said pivot pin, a fluid conduit extending through said registering passageways having one end rigidly connected to said piston in communication with said axial bore and slidable in said passageways in response to the movements of said piston, said conduit including a flexible section extending across the adjacent ends of said closure-member and said movable member, sealing means between said piston and the wall of said stationary member, and between said conduit and said movable member, and means for admitting fluid into said stationary member for actuating said piston.

4. A knuckle joint, comprising, a pair of axially aligned knuckle members connected for relative angular movement, fluid pressure actuated means arranged between said knuckle members for effecting said angular movement, and a fluid conduit extending through both said knuckle members and slidable therein during said angular movement, said conduit including a flexible section extending across the adjacent ends of said knuckle members.

5. A knuckle joint, comprising, a pair of axially aligned knuckle members, a pivot pin connecting said knuckle members for relative angular movement, fluid pressure actuated means arranged between said knuckle members for effecting said angular movement, and a fluid conduit extending axially through said knuckle members and through said pivot pin and slidable therein during said angular movement, said conduit including a flexible section extending across the adjacent ends of said knuckle members and a rigid section extending through said pivot pin.

6. A knuckle joint, comprising, a pair of axially aligned knuckle members connected for relative angular movement, fluid pressure actuated means arranged between said knuckle members for effecting said angular movement, a fluid conduit extending through both said knuckle members and slidable therein during said angular movement, said conduit including a flexible section extending across the adjacent ends of said knuckle members, and a fluid tight seal disposed between said conduit and one of said knuckle members.

CICERO C. BROWN.

REFERENCES CITED

The following references are of record in the file of this patent:

UNITED STATES PATENTS

| Number | Name | Date |
|---|---|---|
| 1,738,819 | Cormier | Dec. 10, 1929 |
| 2,103,988 | Le Bus | Dec. 28, 1937 |
| 2,242,279 | Young | May 20, 1941 |
| 2,333,802 | Lowrey | Nov. 9, 1943 |